G. H. MANN.
VALVE AND VALVE GEAR FOR INTERNAL COMBUSTION ENGINES.
APPLICATION FILED MAR. 11, 1912.
Reissued Mar. 10, 1914. 13,697.
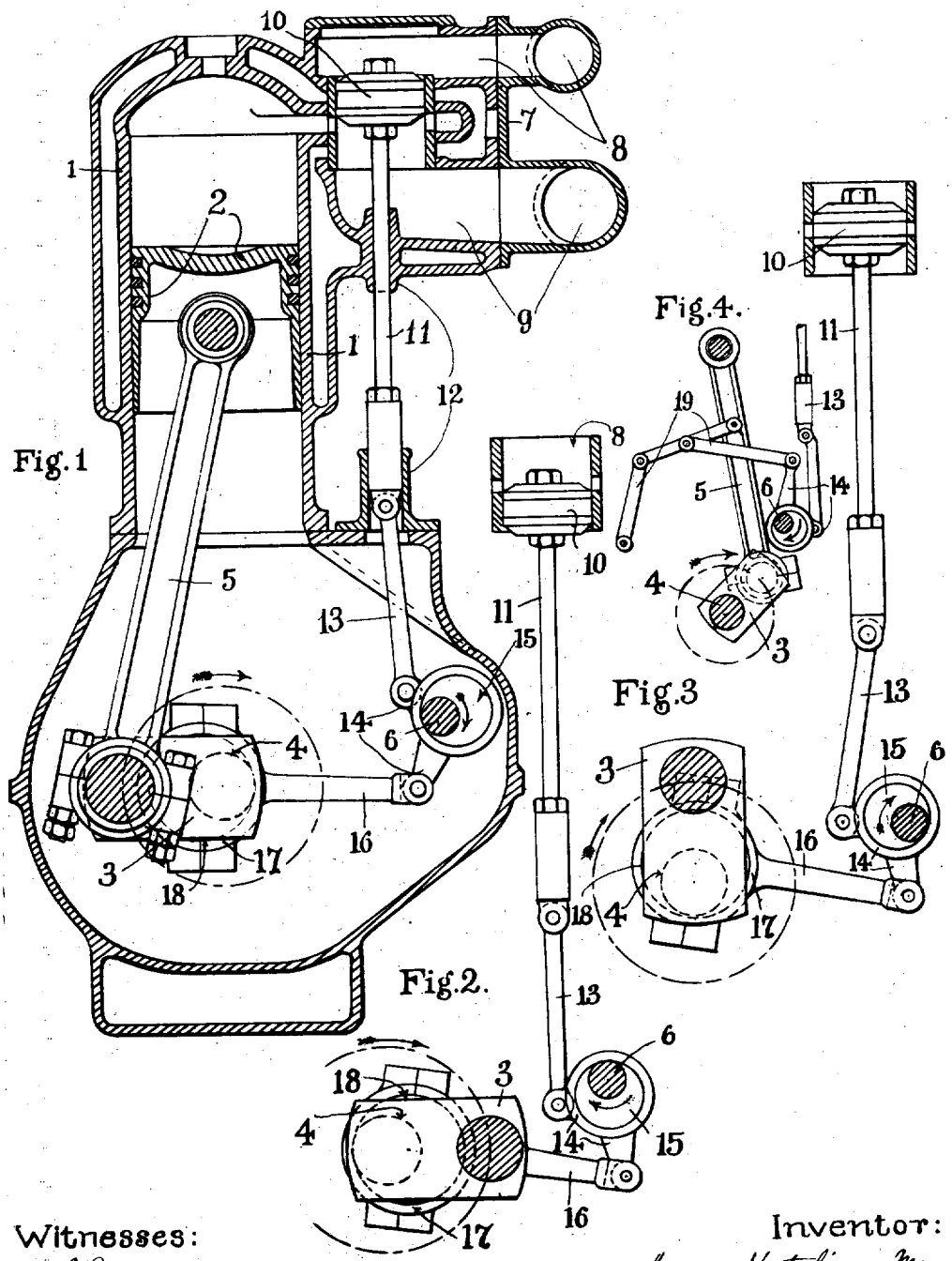
Witnesses:
G. L. Johnson
E. Batchelder
Inventor:
George Hutchinson Mann
by Wright Brown & Quinby Atty's

UNITED STATES PATENT OFFICE.

GEORGE HUTCHINSON MANN, OF LEEDS, ENGLAND.

VALVE AND VALVE-GEAR FOR INTERNAL-COMBUSTION ENGINES.

13,697. Specification of Reissued Letters Patent. Reissued Mar. 10, 1914.

Original No. 970,525, dated September 20, 1910, Serial No. 568,803. Application for reissue filed March 11, 1912. Serial No. 683,092.

*To all whom it may concern:*

Be it known that I, GEORGE HUTCHINSON MANN, a subject of the King of Great Britain, residing at 58 Sholebroke avenue, Leeds, in the county of York, England, have invented certain new and useful Improvements in Valves and Valve-Gear for Internal-Combustion Engines, of which the following is a specification.

This invention relates to internal-combustion engines of the "Otto" or four-stroke cycle type, wherein the engine crank makes two revolutions to one explosion or power stroke. In this type of engine, it is usual to employ separate inlet and exhaust drop valves which are closed by means of springs and have their opening effected by means of cams mounted on a second motion shaft driven from the engine shaft in the ratio of two to one; or in the case of an engine fitted with only a single piston or slide valve, it has heretofore been proposed to actuate the said valve mechanically through the medium of a positive cam situated on the half-speed shaft or by a combined cam and spring arrangement in connection with the half-speed shaft or engine shaft.

Now the object of this present invention is to provide engines of the four-stroke cycle type with a mechanism capable of reciprocating a single piston or slide valve of any form of construction, in such a manner as to insure a positive quick opening and closing movement of both the inlet and exhaust at the proper periods in a more simple and efficient manner than heretofore.

According to my invention, the valve is reciprocated by a mechanism consisting essentially of two eccentrics or equivalent cranks fixed on independent shafts, one of which is the engine shaft or a shaft revolving at the same speed while the other is revolved at half the engine speed; and working on or connected to the eccentric situated on the half-speed shaft is a rocking lever which is vibrated by said eccentric and the combined movement of the other eccentric through the medium of a connecting rod or link. This rocking lever is coupled up by means of another link to the valve rod of the engine; and the positions of the two eccentrics in relation to each other are so arranged that from about the middle of the exhaust stroke to about the middle of the suction stroke they both tend to move the valve in the same direction, while from about the middle of the compression stroke to about the middle of the ignition stroke they tend to neutralize each other and so hold the valve stationary or almost stationary.

Instead of reciprocating the valve by the combined movement of two eccentrics as just described, the desired action of the rocking lever may be obtained through the medium of an eccentric on the half-speed shaft combined with the vibratory movement of the engine connecting rod.

In order to produce the desired reciprocation of the valve by a compound movement obtained from the half-speed shaft and the engine shaft, I provide the half-speed shaft with an eccentric fitted with a bell-crank lever strap or rocking lever whose short arm is connected by means of a pivoted link to the vertically sliding rod which carries the said valve, and on the engine shaft I mount an eccentric fitted with a strap and rod which is coupled up to the longer arm of the bell-crank lever strap or rocking lever of the eccentric on the half-speed shaft; the position of the two eccentrics on their respective shafts being such that during the first or suction stroke, in which the outgoing piston sucks in the explosive mixture, the inlet is quickly opened by the combined action of the two eccentrics which both tend to move the valve downward at the same time, which inlet remains open during the said suction stroke, while during the compression stroke the inlet is quickly closed and caused to remain closed together with the exhaust until nearly the end of the explosion stroke, the said inlet and exhaust being held closed during these periods by reason of the fact that the two eccentrics are tending to move the valve rod in opposite directions until near the completion of the explosion stroke, when the exhaust is opened and remains open throughout the greater portion of the exhaust stroke; after which the same cycle of movements is continued. A positive quick opening and closing movement of the inlet and exhaust is thus obtained at the proper periods, while during another period, that is from the time the inlet is closed to the time the exhaust is opened, the valve remains almost stationary; the quick movements obtained by the action of the two eccentrics tending to move the valve rod in the same direction, while the stationary period is obtained by these two eccentrics tending to move the valve in opposite directions.

With a view to producing the desired movements of the valve by a combined movement obtained from the half-speed shaft and the vibratory movement of the engine connecting rod, I employ an eccentric on the half-speed shaft fitted with a bell-crank lever strap or rocking lever having its short arm connected by means of a pivoted link to the valve rod, the longer arm of the said strap or lever in this case being coupled up by means of pivoted links direct to the engine connecting rod; whereby the vibratory movement of the latter in combination with the eccentric movement obtained from the half-speed shaft is caused to impart to the valve rod similar movements to those hereinbefore described so as to operate the valve to open and close the inlet and exhaust at the proper periods in the engine cycle.

In order that my invention may be clearly understood I will proceed to describe the same with reference to the examples of construction shown in the accompanying drawings, in which similar reference numerals indicate like parts in all the figures; wherein:—

Figure 1 is a sectional elevation of an internal-combustion engine of the four-stroke cycle type, fitted with a valve and valve gear according to one form of construction of the present invention; the parts being shown in the positions they occupy when in the middle of the exhaust stroke. Figs. 2 and 3 are detached views, showing the same valve and its gear in the positions they occupy when half way through the suction stroke and at the commencement of the explosion stroke, respectively. Fig. 4 is a sectional elevation, drawn to a reduced scale, illustrating another form of construction of the valve gear constructed in accordance with the present invention.

Referring to the example of construction shown at Figs. 1, 2 and 3 of the drawings, 1 is the cylinder of the engine wherein works the piston 2 whose motion is transmitted to the crank 3 and engine shaft 4 through the medium of the connecting rod 5. 6 is the half-speed shaft, which is driven by suitable gearing (not shown) from the engine shaft 4 in the ratio of two to one; all of which are of ordinary construction.

According to my invention, the valve box 7 containing the inlet opening 8 and the exhaust opening 9 is fitted with a single piston valve 10 carried on a rod 11 capable of sliding in guides 12, and the lower end of the said rod 11 is connected by means of a pivoted link 13 to the short arm of a bell-crank lever strap or rocking lever 14 situated on an eccentric 15 provided on the half-speed shaft 6 the longer arm of said strap or rocking lever 14 being coupled up to the engine shaft 4 by means of a rod 16 and a strap 17 mounted on an eccentric 18 carried on the said shaft 4, the position of the two eccentrics 15 and 18 on their respective shafts 6 and 4 being such that during the first or suction stroke, in which the out-going piston 2 sucks in the explosive mixture, the inlet 8 is quickly opened by the combined action of the two eccentrics 15 and 18 which both tend to move the valve 10 downward at the same time, the inlet 8 remaining open during the said suction stroke (see Fig. 2) while during the compression stroke, the inlet 8 is quickly closed and caused to remain closed together with the exhaust 9 (see Fig. 3) until nearly the end of the explosion stroke, the said inlet 8 and exhaust 9 being held closed during these periods by reason of the fact that the two eccentrics 15 and 18 are tending to move the valve rod 11 in opposite directions until near the completion of the explosion stroke, when the exhaust 9 is opened and remains open throughout the greater portion of the exhaust stroke (see Fig. 1); after which the same cycle of movements is continued. In this way, a positive quick opening and closing movement of the inlet 8 and exhaust 9 is obtained at the proper periods, while during another period, that is from the time the inlet 8 is closed at the time the exhaust 9 is opened, the valve 10 remains almost stationary; the quick movements of opening and closing the said inlet and exhaust being obtained by the action of the two eccentrics 15 and 18 tending to move the valve rod 11 in the same direction, while the stationary period is obtained by these two eccentrics tending to move the said valve in opposite directions.

Referring to the example of construction shown at Fig. 4 instead of obtaining the necessary movements of the valve rod 11 through the combined action of two eccentrics as before described, I provide the half-speed shaft 6 with an eccentric 15 fitted with a bell-crank lever strap or rocking lever 14 having its short arm connected by means of a pivoted link 13 to the rod 11, but instead of coupling the longer arm of the bell-crank lever strap or rocking lever 14 to the engine shaft 4 I connect the said longer arm by means of pivoted links 19 to the engine connecting rod 5, whereby the vibratory movement of the said connecting rod in combination with the eccentric movement obtained from the half-speed shaft 6 is caused to impart to the valve rod 11 similar movements to those hereinbefore described with reference to Figs. 1, 2 and 3 so as to operate the slide valve to open and close the inlet and exhaust at the proper periods in the engine cycle.

What I claim and desire to secure by Letters Patent of the United States is:—

1. In an internal combustion engine of the four-stroke cycle type, the combination with a half-speed shaft and a shaft rotatable at engine speed, of a single reciprocating slide valve, a rocking lever connected at one point to the slide valve to positively reciprocate it, and independent means actuated by the two shafts to differentially change the positions of two other points of the lever, the relationship of the parts being such that the motion of the lever is derived simultaneously from the two shafts and gives to the valve rapid opening and closing movements, and holds the valve almost stationary during the compression and firing strokes of the engine.

2. In an internal combustion engine of the four-stroke cycle type, the combination with a half-speed shaft, a shaft rotatable at engine speed and eccentric members on the said shafts, of a single reciprocating slide valve and a rocking lever fulcrumed on one of said eccentrics and connected at one end to the said valve, and connected at the other end to the other of the said eccentric members.

3. In an internal combustion engine of the four-stroke cycle type, the combination with a half-speed shaft and a shaft rotatable at engine speed, of a single reciprocating slide valve controlling both the inlet and exhaust, an eccentric on the half-speed shaft, a rocking lever fulcrumed on said eccentric, said rocking lever being positively connected to said valve to actuate the latter, and connections from the other shaft to said rocking lever to oscillate the latter relatively to the eccentric on which it is fulcrumed.

4. A valve gear for internal combustion engines of the four-stroke cycle type comprising in combination a main engine shaft, a counter shaft, driving mechanism for rotating said counter shaft at half the speed of the engine shaft, an eccentric fixed to said counter shaft, an eccentric strap around said eccentric, two arms projecting from said strap of said eccentric at different points on its periphery to form a bell-crank lever, a valve casing located at the side of the main cylinder, and having exhaust and inlet passages communicating with a valve chamber in said casing, a valve capable of reciprocating in said valve chamber to control the admission of motive fluid to and the exit of products of combustion from the engine cylinder, a connection directly between one of said arms on the eccentric strap and said valve, and mechanism connected to the other arm of said eccentric strap to regulate the movements of the latter and communicate the desired movements to said valve substantially as set forth.

5. A valve gear for internal-combustion engines of the four-stroke cycle type comprising in combination a main engine shaft, a counter shaft, driving mechanism for rotating said counter shaft at half the speed of the engine shaft, an eccentric fixed to said counter shaft, an eccentric strap around said eccentric, two arms projecting from said strap of said eccentric at different points on its periphery to form a bell-crank lever, a valve casing located at the side of the main cylinder and having exhaust and inlet passages communicating with a valve chamber in said casing, a piston valve capable of reciprocating in said valve chamber to control the admission of motive fluid to and the exit of products of combustion from the engine cylinder, a rod connected to said piston valve, a link to connect said rod to one of the arms on said eccentric strap, and mechanism connected to the other arm of said eccentric strap in order to regulate the movements of the latter and communicate the desired movements to the said valve substantially as set forth.

6. A valve gear for internal-combustion engines of the four-stroke cycle type comprising in combination a main engine shaft, a counter shaft, driving mechanism for rotating said counter shaft at half the speed of the engine shaft, an eccentric fixed to said counter shaft, an eccentric strap around said eccentric, two arms projecting from said strap of said eccentric at different points on its periphery to form a bell-crank lever, a valve casing located at the side of the main cylinder and having exhaust and inlet passages communicating with a valve chamber in said casing, a piston valve capable of reciprocating in the said valve chamber to control the admission of motive fluid to and the exit of products of combustion from the engine cylinder, a rod connected to said piston, a link to connect said rod to one of the arms on said eccentric strap, and an eccentric mounted on the main engine shaft, a connection between said eccentric and the other arm on said eccentric strap carried by the counter shaft, whereby by the combined movements of the eccentrics, the eccentric strap is so adjusted as to communicate the desired movements to the said valve substantially as set forth.

In witness whereof I have hereunto set my hand in the presence of two witnesses.

GEORGE HUTCHINSON MANN.

Witnesses:

T. SELBY WARDLE.

WALTER J. SKERTEN.